(12) United States Patent
Yokozeki et al.

(10) Patent No.: US 6,700,332 B2
(45) Date of Patent: Mar. 2, 2004

(54) ELECTRODELESS DISCHARGE LAMP SYSTEM

(75) Inventors: Ichiro Yokozeki, Kanagawa-ken (JP); Hiroyuki Doi, Kanagawa-ken (JP); Takashi Terai, Tokyo (JP); Ioshiya Suzuki, Kanagawa-ken (JP); Masaaki Kawamura, Kanagawa-ken (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 0 days.

(21) Appl. No.: 09/960,967

(22) Filed: Sep. 25, 2001

(65) Prior Publication Data
US 2002/0047615 A1 Apr. 25, 2002

(51) Int. Cl.[7] .............................................. H05B 41/24
(52) U.S. Cl. ........................ 315/248; 315/161; 315/283
(58) Field of Search ............................ 315/248, 200 R, 315/224, 160, 161, 258, 272, 274, 283; 323/355, 364; 363/65, 67, 69

(56) References Cited

U.S. PATENT DOCUMENTS 5,519,285 A * 5/1996 Ukegawa et al. ........... 313/594

FOREIGN PATENT DOCUMENTS

| JP | 6-310291 | | 11/1994 |
| JP | 10014243 A | * | 6/1996 |
| JP | 2000-231996 | * | 8/2000 |

* cited by examiner

Primary Examiner—Don Wong
Assistant Examiner—Thuy Vinh Tran
(74) Attorney, Agent, or Firm—Pillsbury Winthrop LLP

(57) ABSTRACT

An electrodeless discharge lamp system includes an excitation coil placed in proximity of the electrodeless discharge lamp, a resonance circuit for supplying appropriate power to the excitation coil, and a high frequency power source driver and wherein, the combined output is achieved by operating the parallel connected power sources in synchronization or approximately in synchronization with each other.

15 Claims, 9 Drawing Sheets

ELECTRODELESS DISCHARGE LAMP SYSTEM

FIELD OF THE INVENTION

The present invention relates to an electrodeless discharge lamp system, more particularly, to an electrodeless discharge lamp system which is used for a tunnel lighting, a bridge lighting, and a photochemical processing device for a sewage bactericidal processing.

BACKGROUND OF THE INVENTION

An electrodeless discharge lamp has a spherical or ellipsoidal glass bulb filled therein with rare earth discharge gas and metal vapor such as mercury vapor. Moreover, an excitation coil is placed near the discharge lamp. By using a high frequency power source the excitation coil induces a magnetic field alternating At 13.56 MHz. The discharge lamp is operated by the electric filed induced by the magnetic field.

A conventional electrodeless discharge lamp system is comprised of, e.g., an electrodeless discharge lamp with spherical glass bulb filled therein discharge gases such as inert gases or metal vapor and coated with either transparent or fluorescent substance on its inner surface, an excitation coil placed in proximity of the periphery of the electrodeless discharge lamp for inducing a high-frequency electromagnetic field, a high frequency power source for supplying a high frequency power to the excitation coil connected thereto, and a matching circuit for matching the excitation coil and the high frequency power source with each other so as to effectively supply the high frequency power to the electrodeless discharge lamp without line reflection.

It is known that the high frequency power source is comprised of a high frequency oscillator for supplying the high frequency power source into the excitation coil, and a DC power source for converting an AC voltage from an AC power source such as a commercial-frequency power source into a DC power voltage for driving the high frequency oscillator A high frequency magnetic field is induced by feeding the excitation coil with a high frequency current at a several MHz to a several hundred MHz from the high frequency power source. Then, a high frequency plasma current is induced inside the electrodeless discharge lamp, and the ultraviolet ray or the visible light is emitted On the other hand, in the conventional electrodeless discharge lamp, impedances of the excitation coil and the electrodeless discharge lamp vary from moment to moment in a while in a transient period from a start of operation till reaching a stable operation. Therefore, according to the change of these impedances, it is necessary to match the impedance of the high frequency power source to that of the excitation coil by adjusting at least the output impedance of the high frequency power source.

For this reason, as an electrodeless discharge lamp system which is capable of transmitting a high frequency power with a high degree of efficiency even though a load condition in tho electrodeless discharge lamp varies, there is proposed an electrodeless discharge lamp system comprised of, e.g., a high frequency power excitation coil coupled across the output terminals of the high frequency power source, an electrodeless discharge lamp filled with discharge gases such as inert gases and metal vapor in its glass bulb, placed in proximity of the high frequency power excitation coil, a first matching circuit connected between the high frequency power source and the high frequency power excitation coil, a coaxial cable connecting the high frequency power source and the first matching circuit, and a second matching circuit connecting the coaxial cable and the high frequency power source in the Japan Unexamined Patent Publication (Kokai) H6-310291.

In the electrodeless discharge lamp system with the above configuration, the coaxial cable is used in matching with the characteristic impedance of the lamp system. As a consequence, the coaxial cable advantageously exerts a high efficiency of power transmission. Moreover, the Japan Unexamined Patent Publication (Kokai) H6-310291 shows a configuration for adjusting operating conditions of the high frequency power source by varying driving DC brass of switching elements of the high frequency power source on and after starting the operation of the electrodeless discharge lamp.

On the other hand, the conventional electrodeless discharge lamp system can be modified to have multiple parallel-connected high frequency power sources, i.e., DC-RF power converters and combine their outputs for transmitting them to its load, i.e., an electrodeless discharge lamp via a transmission line. According to the configuration, it is able to achieve the operation and effect an described above, and it is also able to use power converters with a relatively small power capacity. Therefore, the development of the system becomes easy and be reduced its duration, as well as reduced its manufacturing cost.

However, matters to be considered for changing operating conditions differ between a configuration where only one high frequency power source is subjected for the change of operating conditions like the conventional electrodeless discharge lamp system and a configuration where multiple parallel-connected high frequency power sources of supplying a combined power to a load, i.e., an electrodeless discharge lamp are subjected for the change of operating conditions, as described above. For instance, in the configuration of operating multiple parallel-connected power sources, the operation power increases in proportion to the number of power sources. When these power sources operate in asynchronization with each other, there arises a drawback of upsizing the combiner. That is, such a configuration of combining powers of multiple parallel-connected high frequency power source (DC-RF power converting circuit) is able to improve the power conversion efficiency at a low cost much more than the configuration of supplying a bulk power from only one high frequency power source. However, since it is necessary to deal with a bulk power in a single matching circuit like the conventional device, there arises a drawback that the circuit efficiency and cost efficiency reduce in the matching circuit.

To solve the above drawbacks, inventors have developed an electrodeless discharge lamp system which is comprised of an electrodeless discharge lamp, an excitation coil placed in the proximity along the electrodeless discharge lamp, a resonance circuit for supplying an appropriate power to the excitation coil, a high frequency power source for supplying a combined output of multiple parallel-connected power sources to the resonance circuit, and a driver of the high frequency power source, as a result of several researches and studies The inventors have ascertain that in such an electrodeless discharge lamp system since a combined output of the multiple parallel-connected power sources may be achieved by driven in synchronization or approximately in synchronization with each other, a magnetic flux induced by one power output may be counteracted by other magnetic flux induced by the other power output in the combiner. Therefore, the inventors have also ascertained that since the magnetic fluxes inside a magnetic core utilized in a combiner may counteract each other, and thus core-losses may be reduced in the combiner, the combiner may be miniaturized at a low cost.

Here, as described above, since the operation power of the driver which works as a switching element in the parallel-connected high frequency power sources increases in proportion to the number of an amplifier comprising the power source, the rise in the number of the amplifier without the change of threshold for turning on and off the switching element causes drawback of decreasing a operating voltage of the switching element. So, the inventors have ascertained that if the DC voltage is superposed on the output of the driver for the switching element, the parallel-connected power sources may be driven in a relatively small driver.

On the other hand, the inventors have also ascertained that in case of operating multiple parallel-connected DC-RF power converters in synchronization or approximately in synchronization with each other as the high frequency power source, if the electrodeless discharge lamp system is provided with a combiner for combining output from the parallel connected DC-RF power converters, a matching circuit for matching a condition of the excitation coil for feeding the power to the electrodeless discharge lamp, and a transmission line for transmitting a power to the matching circuit from the combiner, matching circuits of relatively small capacity are provided in a distributed manner without placing a matching circuit collects a bulk power at the input end of the transmission line, thus resulted in achievement of a low-cost high frequency power source and a highly efficient power transmission through the transmission line.

That is, the inventors have ascertained that when the output combined impedance (Zamp-Out) of N-piece parallel-connected DC-RF power converters to the characteristic impedance (Ztl) of the transmission line is defined by a following equation, low-cost high frequency power source and a highly efficient power transmission of the transmission line are achieved.

$$Zamp\text{-}out = N \cdot Ztl$$

Further, in a conventional bactericidal electrodeless discharge lamp system wherein multiple electrodeless discharge lamps were provided in a bactericidal tank, it could take either one of following configurations to achieve a bulk power high frequency signal; a configuration where a reference clock generator is provided for each high frequency power source for each electrodeless discharge lamp and amplified to achieve a bulk power high frequency signal, or a configuration where a clock signal is shared by multiple high frequency power sources in a specific enclosure and supplied for multiple high frequency amplifiers for achieving a bulk power high frequency signal. However, in the former configuration there arises a drawback that an electric field coupling is caused among these electrodeless discharge lamps, thus minute frequency errors of the reference clock causes flickers of the discharge lamp. On the other hand, in the later configuration a phase delay of the reference clock is caused in the power receiving terminal of each high frequency power source while transmitting the reference clock through the cable. Thus, there arises a drawback that when a bulk power high frequency signal achieved by amplifying the clock signal in supplied to each electrodeless discharge lamp, phase differences among powers applied to each electrodeless discharge lamp causes flickers of the discharge lamp.

In order to solve these drawbacks as described above, the inventors have ascertained that in case of connecting multiple high frequency power sources to a reference clock generator in parallel via the coaxial cables for reference clock, the high frequency power source outputs agree in phase with each other by agreeing the lengths of these coaxial cables with each other, thus resulted in prevention of flickers of the discharge lamp.

Further, the inventors have also ascertained that in case of cascading each high frequency power source to the reference clock generator in sequence via the coaxial cables for reference clock, by defining the lengths of the coaxial cable to make the reference clocks of the reference clock input terminal of each high frequency power source or the high frequency power source outputs agree in phase with each other, thus resulted in prevention of flickers of the discharge lamp.

On the other hand, in the bactericidal electrodeless discharge lamp system wherein multiple electrodeless discharge lamps are placed in one bactericidal tank, it is possible to prevent flickers of the discharge lamps by operating multiple high frequency power source with an output applied from a signal reference oscillator. However, if DC voltages are determined in each high frequency power source based on the reference voltage, the intensity of The emitted light varies among electrodeless discharge lamp.

In order to solve the problems, the inventors have ascertained that by supplying only one external dimming signal to the DC power source for supplying DC voltages to each high frequency power source so as to determine these DC voltages as a single unit, thus resulted in prevention of variations in intensity of the emitted lights of the discharge lamps. In this case, for determining DC voltages as a single unit, a photosensor is provided in the bactericidal tank and then a DC voltage in proportion to the amount or an intensity of light detected by the photosensor can be used for determining the DC voltages as a single unit Further, as another way of determining the DC voltages as a single unit, it is able to use the amount of power, which is detectable from the electrodeless discharge lamp system itself, e.g., an output from any high frequency power source by fed back without using the signal from external such as a photosensor.

In addition, in the conventional electrodeless discharge lamp system, the high frequency power source is comprised of a main amplifier and a preamplifer for driving the main amplifier, which are connected directly with a printed wiring. Accordingly, in addition to a difficulty of executing individually an evaluation and a verification of these amplifiers, there was a drawback of lacking versatility for the circuit arrangement of these amplifiers.

To solve this drawback, the inventors have ascertained that by coupling the main amplifier and the preamplifier for driving the main amplifier via a coaxial cable, the flexibility of the block arrangement in an assembling process will increase, thus resulted in ease of verifying characteristics in every block. In this cases it is able to provide a distributor in every block comprised of multiple main amplifiers, and connect a preamplifier to the distributor via a coaxial cable. On the other hand, it is able to provide a distributor in every block comprised of the preamplifier, and connect multiple main amplifiers to the distributor via coaxial cable.

Further, in case of a high frequency power source for generating high frequency power which drives the electrodeless discharge lamps comprising a plurality of parallel power converters, it is able to provide a combiner for combining outputs from these power converters via a balance resistor. Furthermore, it could also define a distributor for distributing inputs to each power converter via s balance resistor.

In the former configuration, the inventors have ascertained that while one of the output terminal of the power converters is opened, short-circuited or no signal input, by getting the rated power of each balance resistor in the combiner for combining outputs of parallel-connected power converters to a value that the output terminal of other power converters can not stand, the electrodeless discharge lamp system may be operated appropriately even in the state where the high frequency power of the high frequency power source decreased by a large amount.

Similarly, in the latter configuration, while one of the output terminal of the power converters is opened, short-circuited or no signal input, the rated power of the balance resistor in the distributor for distributing input to each power converters may be to a value that the output terminal of other power converters can not stand. In such cases, by placing the distributor or combiner on the extension of or equidistantly from the parallel-connected power converters, it is able to prevent the phase difference among their inputs and reduce an adverse effect to the combined output.

Further, when the parallel-connected power converters as the high frequency power sources are divided into multiple blocks and a combiner is provided in each block so as to combine powers of the power converters in each block, it is able to provide an impedance converter between these combiners in order to execute appropriate impedance conversion. However, in this case, there arises a drawback such as a combiner loss caused by the variations of components or an excessive temperature rise in the impedance conversion after the last combining caused by the power concentration.

So, the inventors have ascertained that by combining the powers of every two power converters in a combiner, and converting the impedance of the combined power into a characteristic impedance of the transmission cable to the electrodeless discharge lamp using a $\lambda/4$ transmission line, it is able to reduce the coat of components, the combiner loss, and the variation in conversion of the power converter among the parallel-connected circuits.

Furthermore, when the powers of multiple parallel-connected power converters as a high frequency power source are combined in the combiner, if phase changes occur in the output powers of the power converter, a combiner loss will increase. In order to prevent such a combiner loss, components of respective power converters are aligned roughly in a row, and these power converter are coupled in parallel with each other for achieving a high-density arrangement. However, in such an arrangement, since coils, which constitute an inductor of each series LC resonance filter, are aligned in parallel with each other, the spaces between these coils are lesson in case of reducing the mounting area ever further for the high-density arrangement. Thus, these coils interfere with each other so as to change the filter constant.

The inventors have ascertained that when each power converter is comprised of field-effect transistors (hereinafter, referred to as FETs or FET) and a series LC resonance filter for a class-E operation, where the FETs are arranged in parallel with each other, and the coils constituting the inductor of the series LC resonance filter are arranged in parallel with each other and in a slanting position against the corresponding FETs, it is able to reduce the mutual interference and achieve a high-density arrangement of components.

If the impedance which is a load of the electrodeless discharge lamp varies, it will mismatch to the output impedance of the high frequency power source. To correct the mismatch, the inventors have ascertained that by detecting a phase angle of the high frequency power source output and feeding back the phase angle so as to change the frequency of the high frequency power source, it is able to adjust a load impedance, i.e., the impedance of the electrodeless discharge lamp, and furthermore by detecting the change of the output power caused by the frequency change at the impedance adjustment and feeding back the amount of changing so as to control the power source voltage of the high frequency power source, it is able to adjust the load impedance, i.e., the impedance of the electrodeless discharge lamp and the output impedance of the high frequency power source, thus resulted in that the output power is regulated in constant.

SUMMARY OF THE INVENTION

Accordingly, it is an abject of the present invention to provide an electrodeless discharge lamp system, which is able to simplify the configuration of the high frequency power source for the electrodeless discharge lamp, and which can reduce the cost of manufacturing, and enhance the efficiency of power.

In order to achieve the object, the electrodeless discharge lamp system according to the present invention is comprised of an electrodeless discharge lamp, an excitation coil placed in proximity to the electrodeless discharge lamp, a resonance circuit for supplying appropriate power to the excitation coil, a high frequency power source for supplying a combined output of the parallel-connected power sources, and a high frequency power source driver, and wherein, the combined output is achieved by operating the parallel-connected power sources in synchronization or approximately in synchronization with each other.

In this case, the system may also be provided with a DC voltage superposing circuit for superposing a DC voltage to the output of the driver of the high frequency power source. Then, the DC voltage may be adjustable in the DC voltage superposing circuit.

Moreover, the DC voltage superposing circuit may be so constructed to generate a mean voltage by executing a half-wave rectification on the output of the high frequency power source.

On the other hand, the electrodes discharge lamp system may be comprised of an electrodeless discharge lamp, an excitation coil which is placed in proximity to the electrodeless discharge lamp, a matching circuit for matching conditions of the excitation coil for supplying the power to the electrodeless discharge lamp, a DC-RF power converters which are connected in some parallel arrangements to operate in synchronization or approximately in synchronization with each other, a combiner for combining outputs from the parallel-connected power converters, and a transmission line for transmitting the power from the combiner to the matching circuit.

In this configuration, the output combined impedance (Zamp-out) of the DC-RF power converters which are connected in some parallel arrangements (N parallel arrangements) to the characteristic impedance of the transmission line (Ztl) may be set to become the following equation.

$$\text{Zamp-out} = N \cdot Ztl$$

The electrodeless discharge lamp system may be comprised of multiple electrodeless discharge lamp, excitation coils placed in proximity of these electrodeless discharge lamp multiple electrodeless discharge lamp units, each of which is comprised of a matching circuit for supplying an appropriate power to each excitation coil, high frequency power sources, which input a reference clock signal from the outside sources and amplify it so as to supply the high frequency power to the electrodeless discharge lamp units via a coaxial cable, and a reference clock generator, which is connected to each high frequency power sources in parallel via coaxial cables, for generating a single reference clock signal to he high frequency power sources. Here, the lengths of the coaxial cables connecting the reference clock generator and each high frequency power sources may be agreed with each other.

On the other hand, in the electrodeless discharge lamp system, it is also able to take a configuration of having a reference clock generator which cascades the high frequency power sources via a coaxial cables for generating a single reference clock signal to these high frequency power sources. In this case, the length of each coaxial cable may be agreed with each other so as to make the reference clocks of the reference clock input terminal of each high frequency power source or the high frequency power source output are agreed in phase with each other.

As an alternative configuration, an electrodeless discharge lamp system may be comprised of multiple electrodeless discharge lamps, excitation coils placed in proximity of these electrodeless discharge lamps, a bactericidal device which is provided with multiple electrodeless discharge lamps in a bactericidal tank which has multiple electrodeless discharge lamp units of the matching circuit for supplying the appropriate power to these excitation coils, high frequency power sources to supply the high frequency power to these electrodeless discharge lamp units, and DC power sources fur supplying DC voltages to these high frequency power sources. Here, these DC power sources could determine the DC voltages supplied to each high frequency power source as a single unit by applied with only one external dimming signal.

In this case, by setting a feedback signal for determining the output DC voltage of each DC power source based on the amount of power which is detectable from the electrodeless discharge lamp system itself, it is able to determine the DC voltages as a single unit.

Further, the electrodeless discharge lamp system may be comprised of an electrodeless discharge lamp, excitation coils for supplying tho high frequency power to the electrodeless discharge lamp, a high frequency power source for generating the high frequency power, a high frequency power source driver, and an output circuit for outputting the high frequency power of the high frequency power source to the excitation coils. Here, the high frequency power source is comprised of main amplifiers and a preamplifier for driving the main amplifier, which are connected with each other via a coaxial cable In this case, a distributor is provided in a block of multiple main amplifiers, and the preamplifier may be connected to the distributor via a coaxial cable. Further, the distributor may be provided in a block of the preamplifier and the distributor may be connected to the main amplifiers via coaxial cable.

On the other hand, the electrodeless discharge lamp system may be comprised of an electrodeless discharge lamp, excitation coils for supplying the high frequency power to the electrodeless discharge lamp a high frequency power source comprised of multiple parallel-connected power converters for generating the high frequency power, a high frequency power source driver, an output circuit for outputting the high frequency power of the high frequency power source to the excitation coils, and a combiner comprised of a resistor and combiner for combining the parallel output of the power converters. Here, while one of the output terminal of the power converters is opened, short-circuited or no signal input, the rated power of the balance resistors in the combiner may be set to a value that the output terminal of other power converters can not stand.

It is also able to provide a distributor comprised of a distributor for distributing the parallel inputs of the power converters and a balance resistor. In this configuration, while one of the output terminal of the power converters is opened, short-circuited or no signal input, the rated power of the balance resistor in the distributor for distributing the input to the power converters may be set to a value that the output terminal of other power converters can not stand. In such cause, by placing the distributor or combiner an the extension of or equidistantly from the parallel-connected power converters, it can prevent the phase differences among their inputs and reduce an adverse effect to the combined output.

Furthermore, the electrodeless discharge lamp system may be comprised of an electrodeless discharge lamp, an excitation coil for supplying the high frequency power to the electrodeless discharge lamp, a high frequency power source comprised of parallel power converters for generating the high frequency power, a high frequency power source driver, and au output circuit for outputting the high frequency power of the high frequency power converter to the excitation coils, and herein the power of every two power converters is combined in a combiner, and the impedance of the combined power is converted into a characteristic impedance of a transmission cable to the electrodeless discharge lamp using a $\lambda/4$ transmission line.

The electrodeless discharge lamp system may be comprised of an electrodeless discharge lamp, an excitation coil for supplying a high frequency power to the electrodeless discharge lamp, a high frequency power source comprised of parallel power converters for generating the high frequency power, a high frequency power source driver, an output circuit for outputting the high frequency power of the high frequency power source to the excitation coils, an FET, and a series LC resonance filter for a class-E operation. Here, the FETs are arranged in parallel with each other, and the coils which constitute the inductor of the series LC resonance filter are arranged in parallel with each other and in a slanting position against the corresponding FETs.

The electrodeless discharge lamp system may be comprised of an electrodeless discharge lamp, excitation coils for supplying high frequency powers to the electrodeless discharge lamp, a high frequency power source for generating the high frequency power, a high frequency power source driver, and an output circuit for outputting the high frequency power of the high frequency power source to the excitation coils. Here, by detecting a phase angle of the high frequency power source output and feeding back the phase angle so as to change the frequency of the high frequency power source, it could adjust the impedance which is the load of the electrodeless discharge lamp. Further, by detecting the change of the output power caused by the frequency change at the impedance adjustment and feeding back the amount of changing so as to control the power source voltage of the high frequency power source, it could adjust the impedance which is the load of the electrodeless discharge lamp and the output impedance of the high frequency power source. Thus, the output power may be regulated.

Additional objects and advantages of the present invention will be apparent to person skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily achieved as the same becomes better understood by reference to the following detailed description when considered in connection with the accompanying drawings, wherein:.

FIGS. 3b and 3c are waveform charts for explaining the operation of the driver, as shown in FIG. 8a;

DESCRIPTION OF THE PREFERRED EMBODIMENTS

Referring now to attached drawings, FIGS. 1 to 14, the embodiments of the electrodeless discharge lamp system according to the present invention will be explained hereinafter.

First Embodiment

Figure 1:
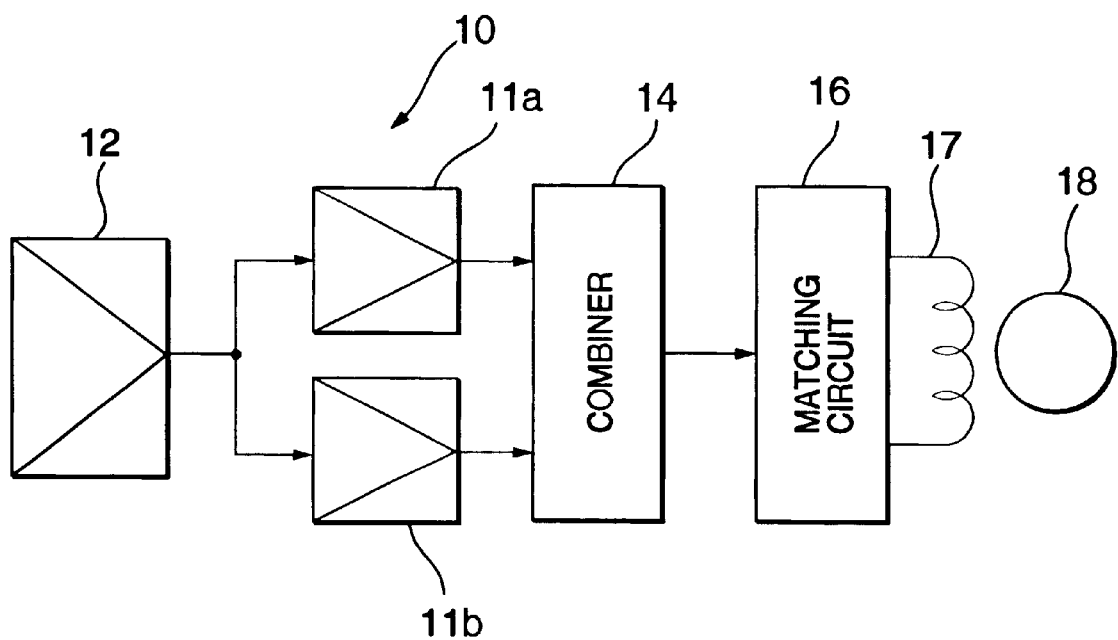
FIG. 1 is a block diagram showing a first embodiment of the electrodeless discharge lamp system according to the present invention.
Figure 2:
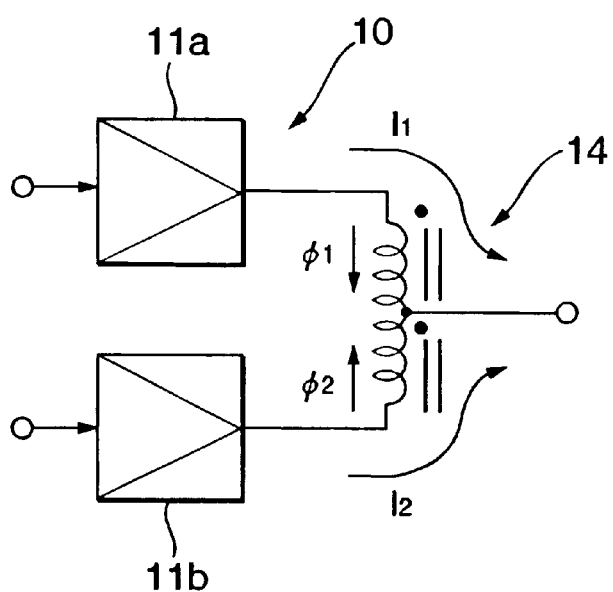
FIG. 2 is a block diagram for explaining the operation of a combiner to the high frequency power source of the electrodeless discharge lamp system shown in FIG. 1.

FIG. 1 is a block diagram showing a first embodiment of the electrodeless discharge lamp system according to the present invention. In FIG. 1, the reference numeral 10 denotes a high frequency power source, which is comprised of a pair of parallel-connected high frequency amplifiers 11a and 11b. The reference numeral 12 denotes a preamplifier for driving the high frequency power source 10. The reference numeral 14 denotes a combiner for combining high frequency outputs from the high frequency power source 10. The reference numeral 16 denotes a circuit for operating appropriately the high frequency output from the high frequency power source 10 and activating the excitation coil 17, i.e., a resonance circuit or a matching circuit for preparing electrical conditions appropriate for an electrodeless discharge lamp 18.

In the present embodiment, the high frequency power source 10 is comprised of a pair of parallel-connected high frequency amplifiers 11a and 11b, and the outputs produced from these high frequency amplifier circuits are combined so as to be supplied to the load, i.e., the electrodeless discharge lamp 18. Thus, by constituting the high frequency power source 10 with multiple amplifiers, it is able to enhance the capacity of supplying power to the electrodeless discharge lamp 18. Accordingly, when multiple high frequency amplifiers are driven, the operation power will increase in proportion to the number of the amplifiers. Especially, when these amplifiers operate in asynchronization with each other, it causes upsizing the combiner 14. So, in the present embodiment, the parallel-connected amplifiers 11a and 11b are driven in synchronization or approximately in synchronization with each other to achieve the combined output (see FIG. 2). That is, by combining multiple synchronous high frequency outputs in the combiner 14, a magnetic flux Φ1 induced by one high frequency output is counteracted by another magnetic flux Φ2 induced by the other high frequency output. Therefore, the magnetic fluxes inside magnetic cores utilized in the combiner 14 counteract each other, and thus core losses in the combiner 14 are extensively reduced. As a result, it is able to miniaturize the combiner 14 at a low cost.

Figure 3A:
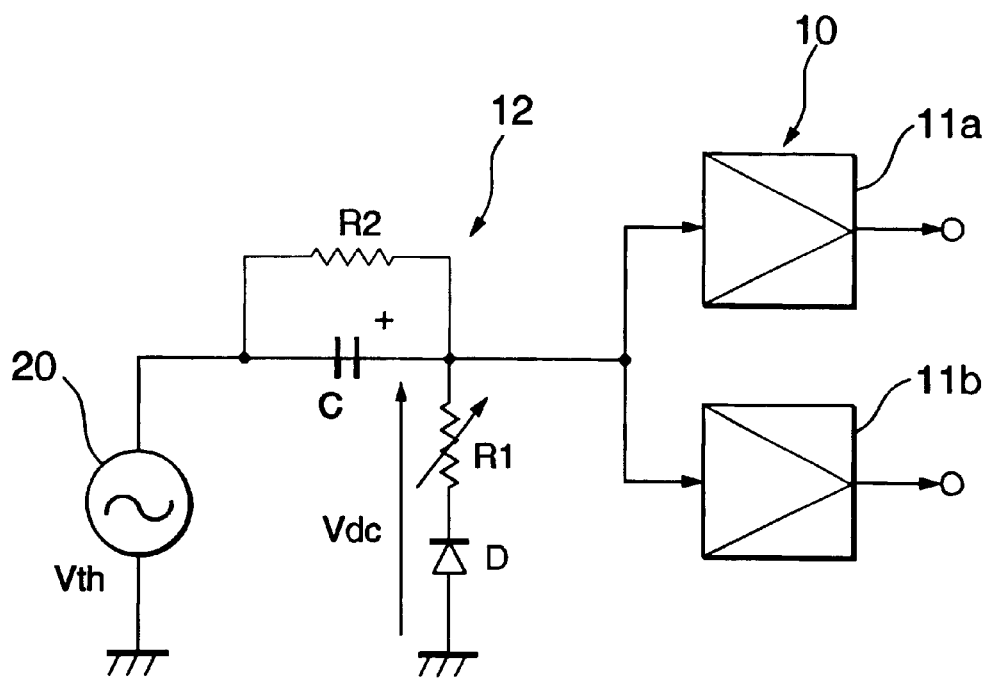
FIG. 3a is a block diagram showing a driver for driving high frequency power source of the electrodeless discharge lamp system shown in FIG. 1.
Figure 3B:
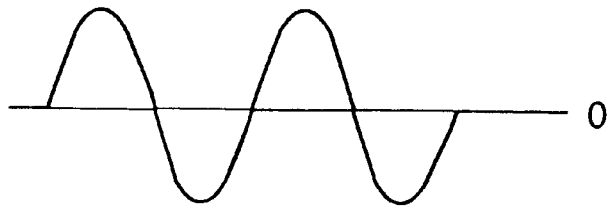
Figure 3C:
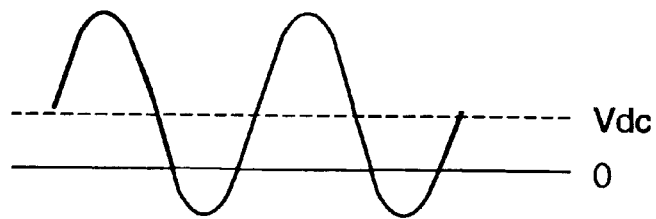

FIG. 3 is a block diagram showing a preamplifier 12 for driving the high frequency power source 10 of the electrodeless discharge lamp system according to the present invention. As described above, the operation power of a driver which executes as a switching element of the parallel-connected high frequency power sources increases in proportion to the number of the amplifier comprising a power source. Thus, if the amplifier increases in number without changing the threshold for turning the switching element on and off (the threshold of the commercial-frequency power source 20), the operating voltage of the switching element decreases. So, the present embodiment is characterized by that the DC voltage is superposed on the output of the preamplifier 12. As a result, in the preamplifier 12, as shown in FIG. 3a, it is able to drive the parallel-connected amplifiers 11a and 11b appropriately by superposing the DC voltage (Vdc) from the DC power source on the output of the preamplifier 12 (sec FIG. 3c) without changing the threshold Vth (the threshold of the commercial-frequency power source 20) (see FIG. 3b).

The preamplifier 12, as shown in FIG. 3a, executes a half-wave rectification on an AC voltage from the commercial-frequency power source 20 in a diode D so as to achieve a DC voltage, and it divides the DC voltage into a predetermined voltage Vdc in a voltage dividing circuit comprised of the resistors R1 and R2, then it superposes the divided DC voltage Vdc on the AC voltage Vth from the commercial-frequency power source 20 to be applied to the parallel-connected amplifiers 11a and 11b. Here, if the resistors R1 and R2 have sufficient amount of resistances, and a capacitor C with a reactance sufficiently smaller than that of the resistor R2 is connected in parallel to the resistor R2, it is regarded that the resistors R1 and R2 would be absent in the preamplifier 12 in an AC operation mode. In such a circuit configuration, the AC voltage Vth is supplied to the parallel-connected amplifiers 11a and 11b via the capacitor C, and a DC bias, i.e., the DC voltage Vda is superposed on the AC voltage Vth. Accordingly, in such a configuration, it is able to drive appropriately the parallel-connected amplifiers 11a and 11b by a preamplifier 12, which operates in relatively small capacity at a low cost. Further, by sitting the ratio of the resistor R1 and the resistor R2 to be variable, the superposed DC voltage can be properly adjusted.

Second embodiment

Figure 4:
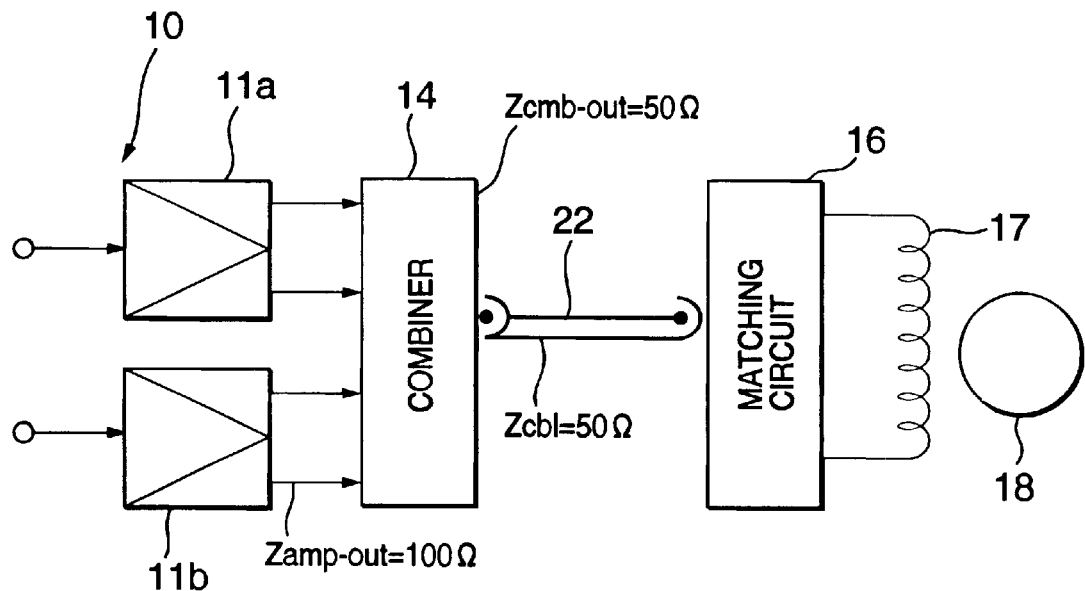
FIG. 4 is a block diagram showing a second embodiment of the electrodeless discharge lamp system according to the present invention.
Figure 5:
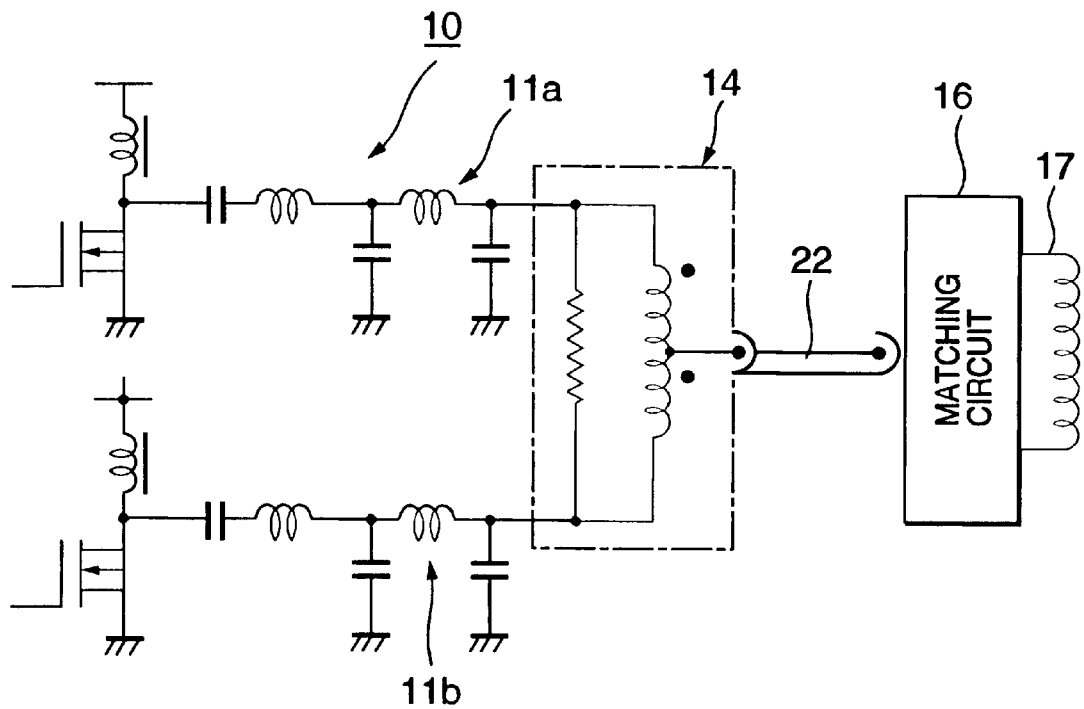
FIG. 5 is a circuit diagram of the high frequency power source for the electrodeless discharge lamp system, as shown in FIG. 4.

FIG. 4 and 5 are a brief circuit configuration diagram and a partial arrangement of the second embodiment of the electrodeless discharge lamp system according to the present invention. In FIG. 4 and 5, tho reference numeral 10 denotes the high frequency power source, which is comprised of a pair of parallel-connected high frequency amplifiers 11a and 11b. In FIGS 4 and 5, the principal configuration of the electrodeless discharge lamp system of the present embodiment is common to that of that of the first embodiment, as shown in FIG. 1. Thus, the same elements as those, as shown in FIG. 1, are assigned with same marks and omitted the explanation.

In this embodiment, The outputs from the high frequency power source 10, which is comprised of a pair of parallel-connected high frequency amplifiers 11a and 11b, are combined and supplied to a load, i.e., the electrodeless discharge lamp 18. In FIG. 4, the power outputted from a pair of parallel-connected amplifiers 11a and 11b, which constitute the high frequency power source 10, are combined in a combining circuit 14. The combined output is supplied to a matching circuit 16, which activates an excitation coil 17 of the electrodeless discharge lamp 18, via a transmission line 22. Here, it is characterized by that the amplifiers 11a and 11b are constructed of DC-RF power converters that are operated in synchronization or almost in synchronization with each other. That is, according to parallel-connected DC-RF power converters, it is able to achieve relatively bulk power, and also it is able to distribute matching circuits of relatively small capacity without placing a matching circuit which collects a bulk power at the input end of the transmission line 22 which is comprised of a coaxial cable, so as to achieve a low-cost of the high frequency power source and a high efficiency of the power transmission of the transmission line.

By the way, it will be a disadvantage in aspects of cost and efficiency to deal with a bulk power in the matching circuit. However, it will not so much count against the aspects of cost and efficiency to deal with a bulk power in the combiner. That is because, the power lose which is caused by reactive power occurs in the inductor which comprises the matching circuit when the inductor stores in or releases out the passing power. On the other hand, in the inductor which comprises the combiner, the reactive powers may counteract each other. Accordingly, in the present embodiment, by combining the outputs from the parallel-connected DC-RF power converters which operate in synchronization or almost in synchronization with each other, it is able to achieve an electrodeless discharge lamp system which has extremely little power loss.

Further in the present embodiment, when the output combined impedance Zamp-out of parallel-connected N (N=2 in FIGS. 4 and 5) DC-RF power converters to the characteristic impedance Ztl of the transmission line 22 is defined by an equation; Zamp-out=N·Ztl, it is able to achieve the low-cost high frequency power source and the high efficiency of the power transmission of the transmission line. That is, in FIGS. 4 and 5, if the characteristic impedance Ztl of the transmission line 22 is 50Ω, (here, N is also 2), the output combined impedance Zamp-out will be 100Ω. Accordingly, it is able to distribute matching circuit of relatively small capacity without placing a matching circuit which collects a bulk power at the input side of the transmission line 22 which is comprised of a coaxial cable, e.g., so as to achieve a low-cost of the high frequency power source and a high efficiency of the power transmission of the transmission line.

Figure 6:
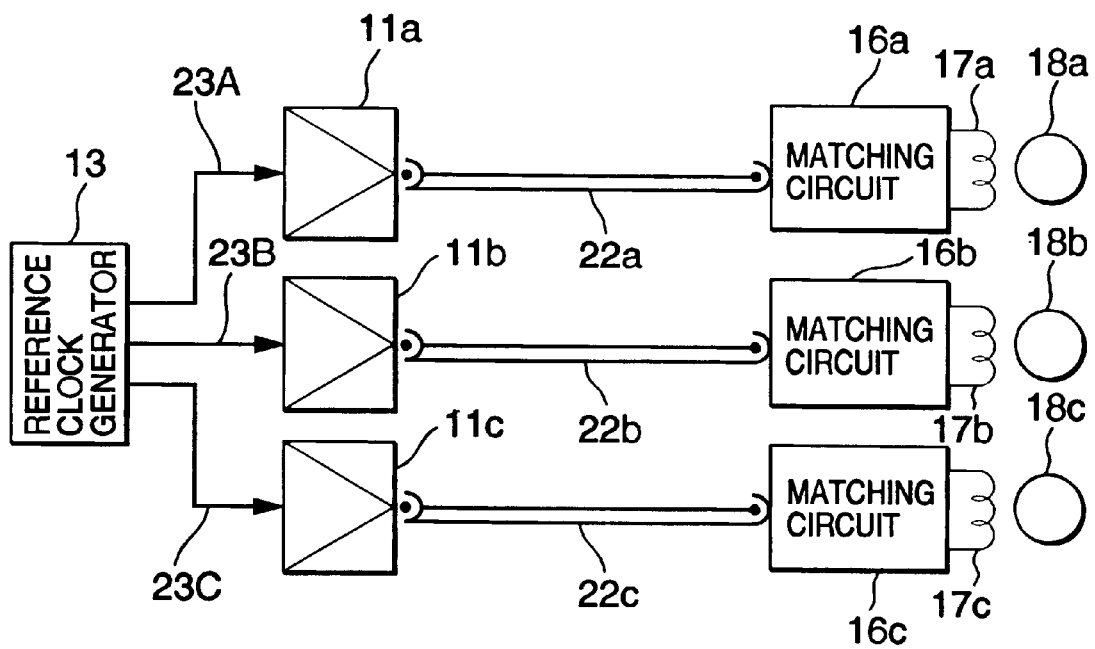
FIG. 6 is a block diagram showing one configuration of the third embodiment of the electrodeless discharge lamp system according to the present invention.
Figure 7:
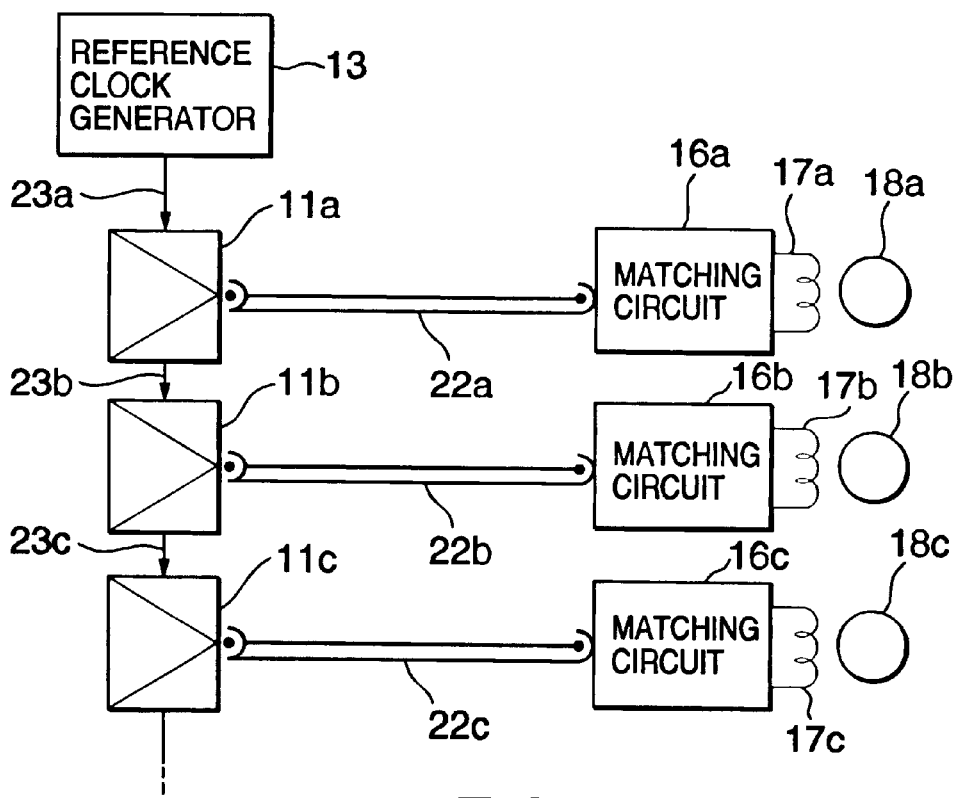
FIG. 7 is a block diagram showing another example of the third embodiment of the electrodeless discharge lamp system according to the present invention.

Moreover. FIG. 5 is showing an arrangement of the high frequency power source which is comprised of parallel-connected single-class-E-operation FET's DC-RF power converters. By operating these DC-RF power converters in synchronization or almost in synchronization with each other, it is able to lower the power loss in the combiner 14. Further, by matching the output of the combiner 14 with the characteristic impedance of the transmission line (a coaxial cable) 22, it is able to distribute matching circuits of relatively small capacity without placing a matching circuit which collects a bulk power at the input side of the transmission line 22 (a coaxial cable). e.g., so as to achieve a low-cost of the high frequency power source and a high efficiency of the power transmission of the transmission line Third Embodiment FIG. 6 and 7 are brief circuit configuration diagrams showing an example and another arrangement of the third embodiment of the electrodeless discharge lamp system according to the present invention. In FIGS. 6 and 7, the principal configuration of the electrodeless discharge lamp system of the present embodiment is common to that of that of the first embodiment, as shown in FIG. 1. Thus, the same elements as those, as shown in FIG. 1, are assigned with same marks and omitted the explanation.

In FIG. 6, a reference clock is supplied to the main amplifiers 11a, 11b, and 11c in parallel via coaxial cables 23a, 23b, and 23c from a common reference clock generator 13. The reference numerals 16a, 16b, and 16c denote matching circuits for preparing electric conditions appropriate for electrodeless discharge lamps 18a, 18b, and 18c which constitute loads in the electrodeless discharge lamp system, and activate excitation coils 17a, 17b and 17c. In this case, by matching roughly the length of the coaxial cables 23a, 23b, and 23c, it is able to adjust the output phases of the amplifiers 11a, 11b, and 11c. Thus, it is able to prevent flickers of the electrodeless discharge lamps 18, 18b and 18c.

For instance, in a conventional electrodeless discharge lamp system wherein multiple electrodeless discharge lamps are provided in one bactericidal tank, it is allowed to take either one of following configurations for achieving a bulk power high frequency signal, i.e., a configuration where a reference clock generator is provided for the high frequency power sources for the electrodeless discharge lamps to achieve a bulk power high frequency signal by amplifying the clock signal generated by the clock generator, or another configuration where one clock signal is shared by high frequency power sources in a specific enclosure, and distributed to a plurality of high frequency amplifiers. However, in the former configuration, there was a drawback that electric field couplings caused among electrodeless discharge lamps, and minute frequency errors of the reference clock appearing as flickers of discharge lamp. On the other hand, in the later configuration, there was a drawback that a phase delay of the reference clock occurred at receiving terminals of the high frequency power sources during transmitting the reference clock through the cable, and in case of a bulk power high frequency signal achieved by amplifying the clock signal supplied to the electrodeless discharge lamps, a phase difference occurred among powers supplied to respective electrodeless discharge lamps and appearing as flickers of discharge lamp. So, in the present embodiment, the phases of the outputs of the amplifiers 11a, 11b and 11c are agreed with each other by agreeing roughly the lengths of the coaxial cables 23a, 23b and 23c with each other and thus preventing flickers of the discharge lamps 18a, 18b and 18c.

FIG. 7 is a brief circuit configuration diagram showing an example that the common reference clock generator is cascaded to the amplifiers 11a, 11b and 11c via the coaxial cables 23a, 23b and 23c. In this case, by matching roughly the length of the coaxial cable 23a, 23b and 23c, the reference clock phases at the input terminals of the reference clocks of the amplifiers 11a, 11b and 11c, and the phases of the output power of the amplifiers 11a, 11b and 11c, it is able to prevent flickers of the electrodeless discharge lamps 18a, 18b and 18c.

Accordingly, in the case of cascading the amplifiers 11a, 11b and 11c to the reference clock generator 13 via the coaxial cables 23a, 23b and 23c as described above, the time delay among the reference clocks usually occurs in succession in the waveform shaping circuits integrated in the main amplifiers 11a, 11b and 11c, so as to cause the differences between the output phases of the amplifiers. So, in the present embodiment, in consideration of the time delay among the reference clocks in the amplifiers 11a, 11b and 11c, the length of the coaxial cables for reference clock 23a, 23b and 23c may be arrange. Thus, it is able to prevent flickers of the discharge lamps 18a, 18b and 18c.

Fourth Embodiment

Figure 8:
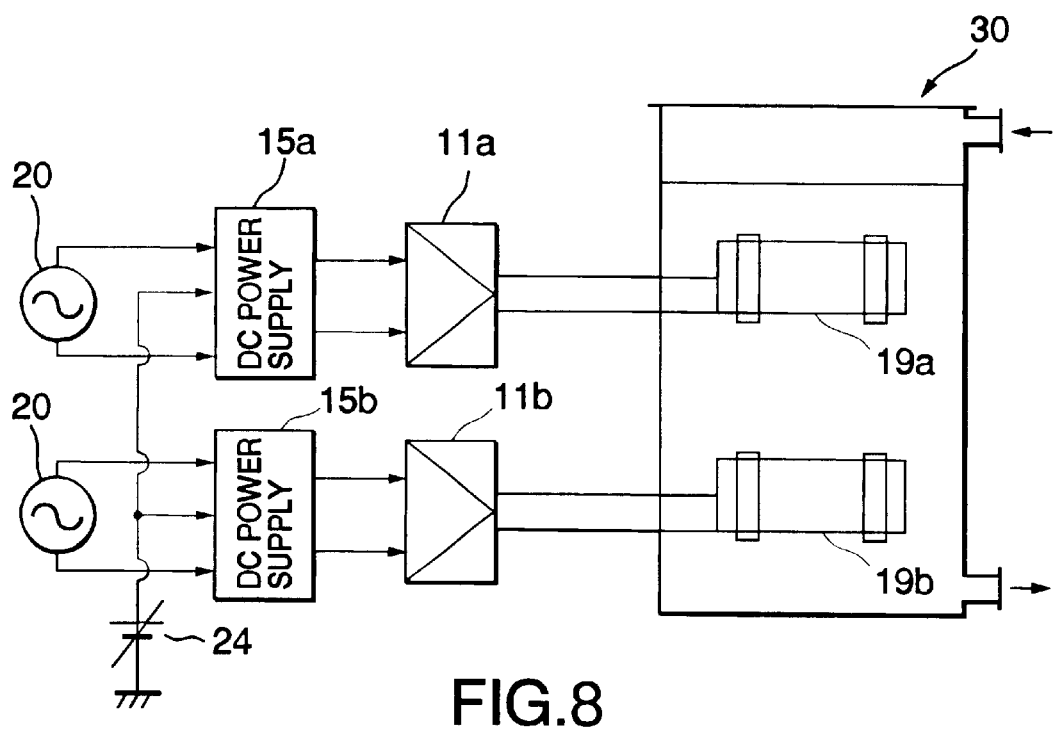
FIG. 8 is a block diagram showing one example of the fourth embodiment of the electrodeless discharge lamp system according to the present invention.
Figure 9:
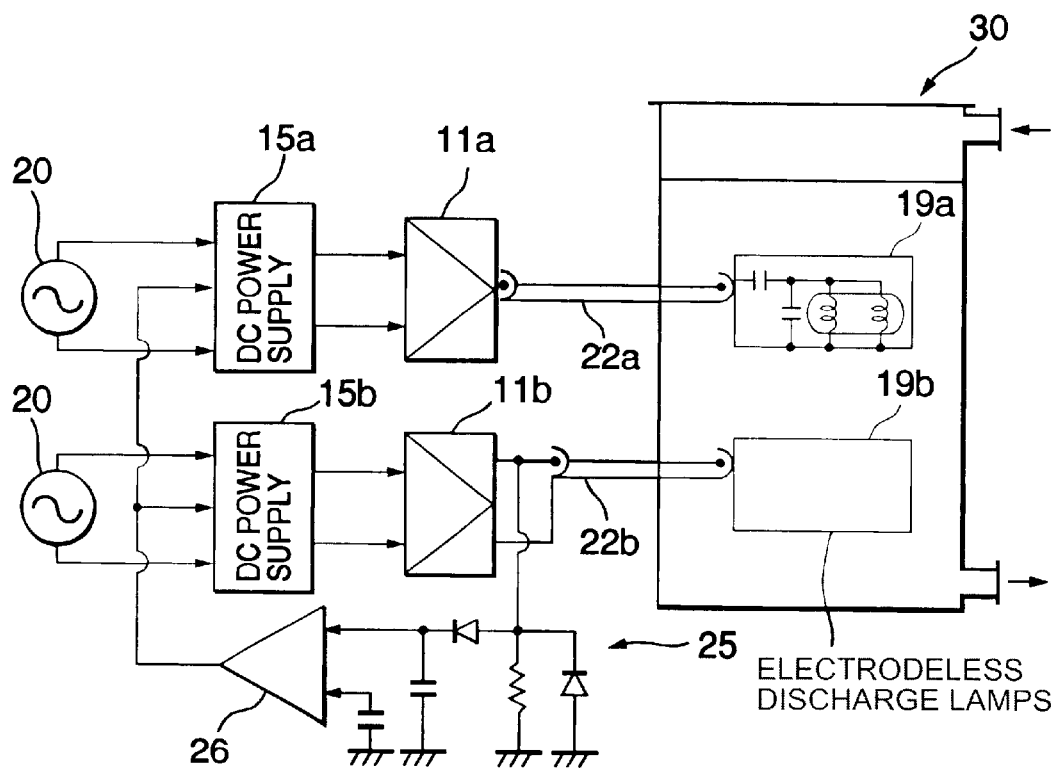
FIG. 9 is a block diagram showing another example of the fourth embodiment of the electrodeless discharge lamp system according to the present invention.

FIG. 8 and it are block diagrams showing two aspects of a bactericidal electrodeless discharge lamp system as of the fourth embodiment according to the present invention. In FIGS. 8 and 9, the principal configuration of the electrodeless discharge lamp system of the present embodiment is common to that of the first embodiment, as shown in FIG. 1. Thus, the same elements as those, as shown in FIG. 1, are assigned with same marks and omitted the explanation.

As shown in FIG. 8, in the bactericidal electrodeless discharge lamp system of the present embodiment, electrodeless discharge lamp units 19a and 19b are provided in a bactericidal tank 30. Each of the electrodeless discharge lamp units is comprised of multiple electrodeless discharge lamps, excitation coils placed in proximity of these electrodeless discharge lamps and matching circuits which supply appropriate powers to the excitation coils. The high frequency powers are supplied to the electrodeless discharge lamps 19a and 19b from the main amplifiers 11a and 11b. These amplifiers 11a and 11b are driven by the commercial-frequency power sources 20, 20 having the same characteristics via the DC power sources 15a and 15b.

That is, in the bactericidal electrodeless discharge lamp system of the present embodiment, by driving the high frequency power sources comprised of multiple amplifiers based on the reference oscillation source of the same characteristics, it is able to prevent flickers of the discharge lamps. On the other had, an external dimming signal is applied to these DC power sources 15a and 15b from a single signal source 24, so as to determine these DC voltages as a single unit. According to such a configuration as described above, the difference in intensity among these discharge lamps is reduced. As a means for determining DC voltages as a single unit, it is able to provide photosensors in the bactericidal tank 30 for yielding DC voltages varying in proportion to the amount or intensity of the light received in the photosensor.

Further, FIG. 9 is a brief circuit configuration diagram showing an example that by setting a feedback signal for determining the output DC voltages of the DC power sources 15a and 15b based on the amount of power which is detectable from the electrodeless discharge lamp system itself, it determine the DC voltage as a single unit. Further, as a means for determining the DC voltages as a single unit, it is able to feedback an electrical quantity capable of detecting from the electrodeless discharge lamp system itself, e.g., by detecting an output from any amplifier, for instance, the amplifier 11b, as shown in FIG. 9, by an RF-detector/DC-converter 25, converting the detected output into a DC signal and then feeding back the DC signal through an error amplifier 26, in place of the external signal from such photosensors. That is, in the present embodiment, as the means for determining the DC voltage of the DC power sources 15a and 15b as a single unit, the amount of the power which is detectable in the electrodeless discharge lamp system, e.g., the output from any amplifier such as the amplifier 11b is detected and converted into the DC voltage in the RF-detector/DC-converter 25, and fed back to the DC power sources 15a and 15b via the error amplifier 26, without using the signal from external. According to the configuration as described above, it is able to prevent variations in intensity of the emitted lights of the discharge lamps.

Fifth Embodiment

Figure 10A:
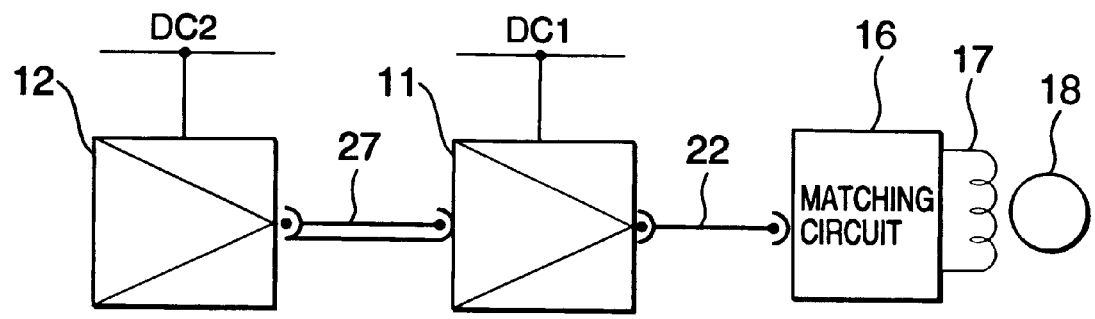
FIG. 10a is a block diagram showing one example of the fifth embodiment of the electrodeless discharge lamp system according to the present invention.
Figure 10B:
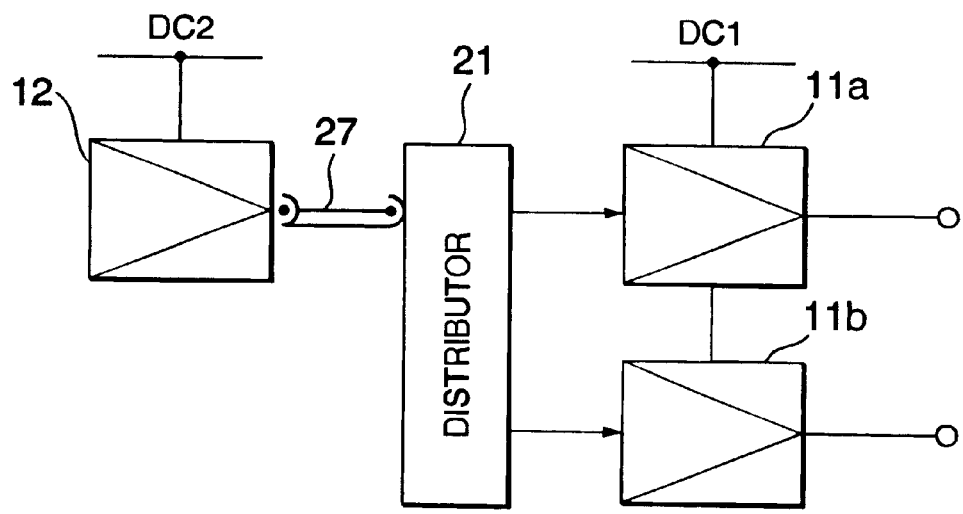
FIG. 10b is a block diagram showing other example of the fifth embodiment of the electrodeless discharge lamp system according to the present invention.
Figure 10C:
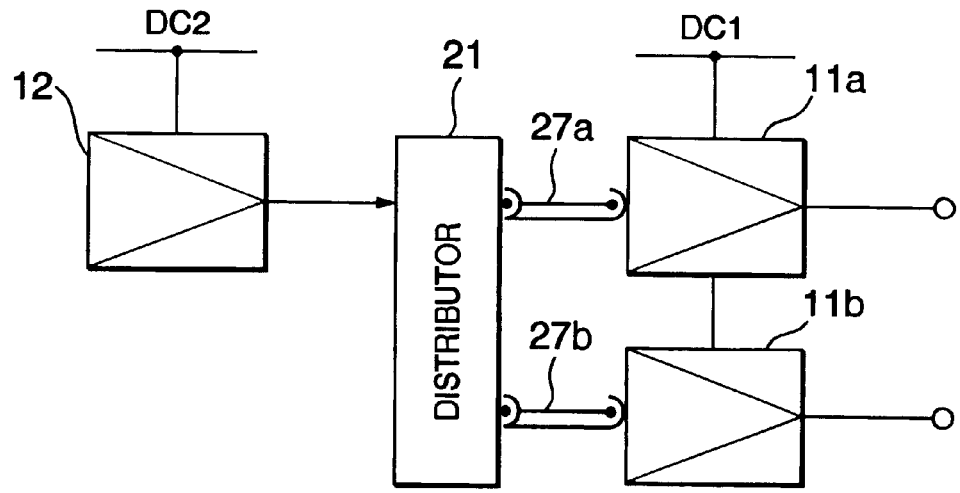
FIG. 10c is a block diagram showing yet other example of the fifth embodiment of the electrodeless discharge lamp system according to the present invention.

FIG. 10a through 10c are brief circuit configuration diagrams showing three arraignments of the fifth embodiment of the electrodeless discharge lamp system according to the present invention. In FIG. 10a through 10c, the principal configuration of the electrodeless discharge lamp system of the present embodiment is common to that of the first embodiment, as shown in FIG. 1. Thus, the same elements as those, as shown in FIG. 1, are assigned with same marks and omitted the explanation.

In FIG. 10a, it is characterized by that a main amplifier 11 comprising the high frequency power source and a preamplifier 12 for driving the main amplifier 11 are coupled via a coaxial cable 27. That is, in the conventional electrodeless discharge lamp system, since the main amplifier and the preamplifier for driving the main amplifier are connected directly with a printed wiring, in addition to a difficulty of executing individually an evaluation and a verification of these amplifiers, there was a drawback of lacking versatility for the circuit. arrangement of these amplifiers. So, in the present embodiment, as shown in FIG 10a, by connecting the main amplifier 11 and the preamplifier 12 for driving the main amplifier with the coaxial cable 27, it increases the flexibility of arranging the circuits of the those amplifiers in designing products. Furthermore, it is easy to executes individually the evaluation and verification of these amplifiers.

Further, as shown in FIG. 10b, in case of connecting the main amplifiers 11a and 11b in parallel, a distributor may connected to these amplifiers 11a and 11b, and to the preamplifier 12 via the coaxial cable 27. As another way, as shown in FIG. 10c, the main amplifiers 11a and 11b may be connected to the distributor 21 via the coaxial cables 27a and 27b.

Sixth Embodiment

Figure 11:
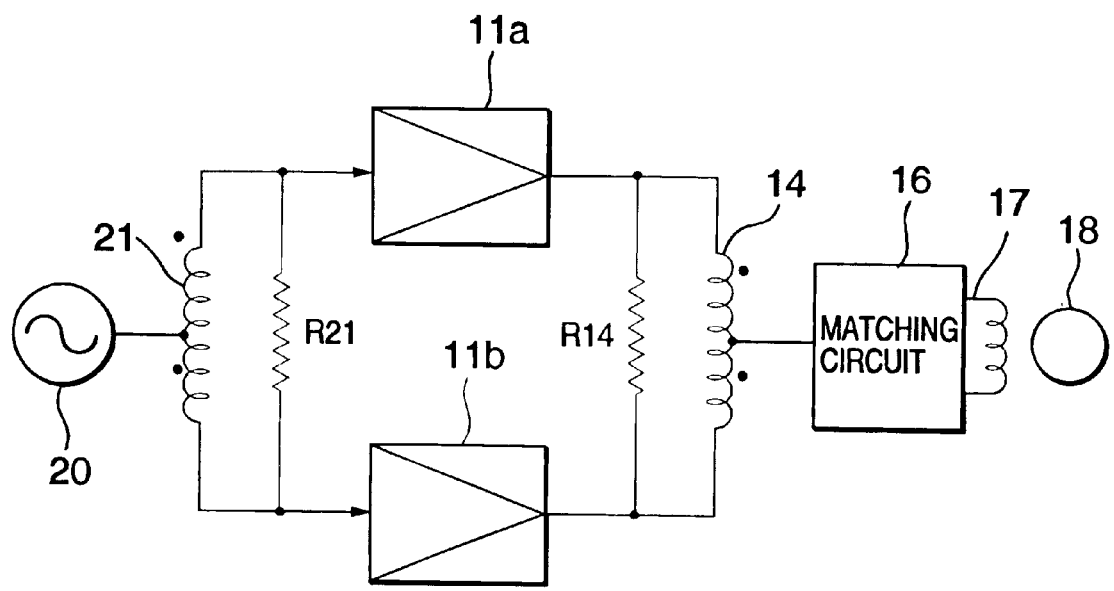
FIG. 11 is a block diagram showing the sixth embodiment of the electrodeless discharge lamp system according to the present invention.

FIG. 11 is a brief circuit configuration diagram showing the sixth embodiment of the electrodeless discharge lamp system according to the present invention. In FIG. 11, the principal configuration of the electrodeless discharge lamp system of the present embodiment is common to that of the first embodiment, as shown in FIG. 1. Thus, the same elements as those, as shown in FIG. 1, are assigned with same marks and omitted the explanation.

In the present embodiment, a distributor comprised of a distributor 21 and a balance resistor R21 distributes an input to the power converters 11a and 11b which construct the high frequency power source. Then, the outputs produced from the power converters 11a and 11b comprising the high frequency power source are combined in a combiner which is comprised of a balance resistor R14 and a combiner 14. In this case, the rated power of the balance resistor R21 in the distributor may be set to a value that the output terminal of any one of the power converters 11a and 11b can not stand when the output terminal of the other of the power converters 11a and 11b is opened, short-circuited or no signal input. On the other hand, the rated power of the balance resistor R14 in the distributor may be set to a value that the output terminal of any one of the power converters 11a and 11b can not stand when the output terminal of the other of the power converters 11a and 11b is opened, short-circuited or no signal input.

As described above, by setting the rated powers of the balance resistors in the combiner and distributor to a value that the output terminal of any one of the power converters can not stand when the output terminal of the other of the power converters is opened, short-circuited or no signal input, it is able to prevent that the electrodeless discharge lamp system in the rest of the power converters operates under abnormal conditions. In such a case, by placing the distributor or combiner on the extension of or equidistantly from the multiple parallel-connected power converters, it is able to prevent the phase difference among inputs to the power converters to mitigate the adverse effect to the combined power.

Seventh Embodiment

Figure 12A:
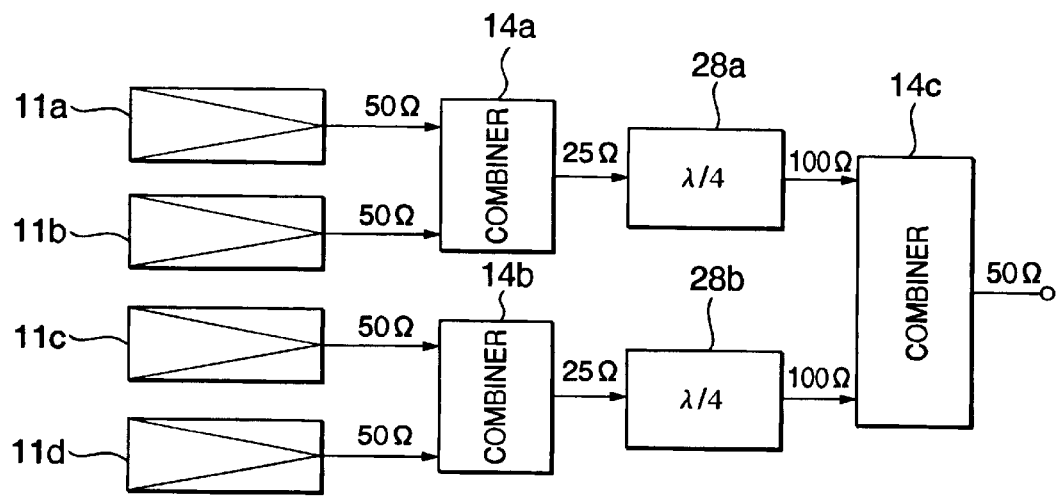
FIG. 12a is a block diagram showing one example of the seventh embodiment of the electrodeless discharge lamp system according to the present invention.
Figure 12B:
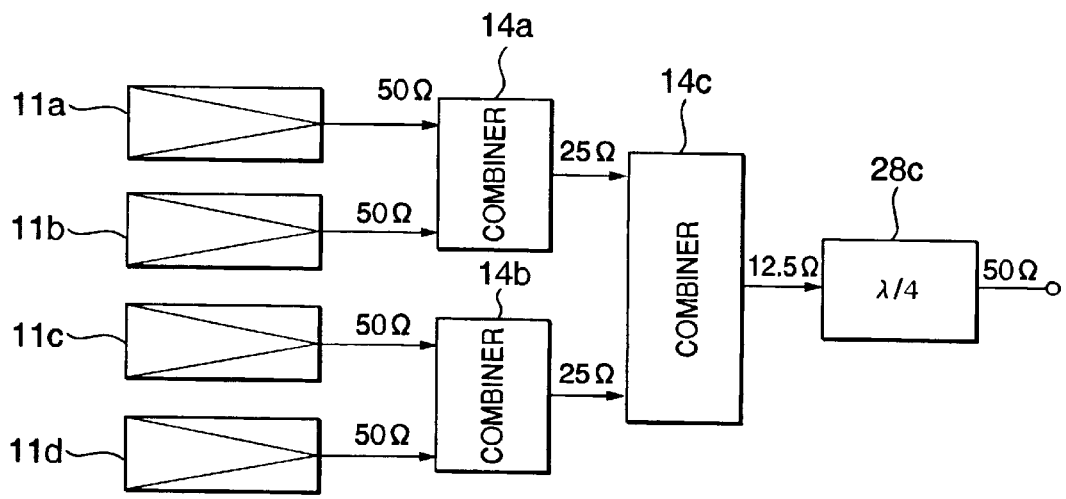
FIG. 12b is a block diagram showing another example of the seventh embodiment of the electrodeless discharge lamp system according to the present invention.

FIG. 12a and 12b are brief circuit configuration diagrams showing two aspects of the seventh embodiment of the electrodeless discharge lamp system according to the present invention. In FIGS. 12a and 12b, the principal configuration of the electrodeless discharge lamp system of the present embodiment is common to that of the first embodiment, as shown in FIG. 1. Thus, the same elements as those, as shown in FIG. 1, are assigned with same marks and omitted the explanation.

In the present embodiment, as shown in FIGS. 12a and 12b, it is characterized by that it is provided with an impedance convertor, which is comprised of $\lambda/4$ transmission lines, for converting a signal impedance into a characteristic impedance of transmission cable to the electrodeless discharge lamp. Specifically, the electrodeless discharge lamp system, as shown in FIG. 12a, is provided with four power converters 11a, 11b, 11c and 11d, three combiners 14a, 14b and 14c, and two impedance converters 28a and 28b. Each two of four power converters 11a, 11b, 11c and 11d are connected in parallel to produce output to each one combiner. Then, the outputs from these combiners 14a and 14b are combined in the third combiner 14c via each of corresponding converters 28a and 28b, so as to be applied to the electrodeless discharge lamp (not shown in FIG. 12a). On the other hand, the electrodeless discharge lamp, as shown in FIG. 12b, is provided with four power converters 11a, 11b, 11c and 11d, three combiners 14a, 14b and 14c, and one impedance converter 28c, each two of four power converters 11a, 11b, 11c, and 11d are connected in parallel to produce outputs to each one combiner. Then, the outputs from these combiners 14a and 14b are combined in the third combiner 14c, and the total combined output is applied to the electrodeless discharge lamp (not shown in FIG. 12b) via the impedance converter 28c. Accordingly, by converting the impedance of the power which is transmitted from each power converters 11a, 11b, 11c and 11d which constitute the high frequency power sources in the impedance converter appropriately on or after the power is combined in the combiners, it is able to reduce the cost of components, the combiner loss, and the variation in conversion of the power converter among the parallel-connected circuits.

That is, in the circuit configuration, as shown in FIG. 12a, the impedance of the power outputted from the parallel-connected power converters 11a, 11b, 11c and 11d will drop from e.g., 50Ω to 25Ω thorough the combiners 14a and 14b. Further, the each impedance of the power output from these combiners 14a and 14b rises from 25Ω to 100Ω through each impedance converters 28a and 28b. Furthermore, the impedance of the power output from the impedance converter 28a and 28b drop again from 100Ω to 50Ω via the combiner 14c, thus, it will match to the characteristic impedance of the transmission cable to the electrodeless discharge lamp.

In the circuit configurations as shown in FIG. 12, the impedance of the power output from the parallel-connected power converters 11a, 11b, 11c and 11d drops from e.g., 50Ω to 25Ω thorough the combiners 14a and 14b. The output power combined in each combiners 14a and 14b are combined in combiner 14c, where the impedance will drop from 25Ω to 12.5Ω. Then, the impedance of the power output from the combiner 14c rises from 12.5Ω to 50Ω again in the impedance converter 28c, thus, it will match to the characteristic impedance of the transmission cable to the electrodeless discharge lamp.

Eighth Embodiment

Figure 13:
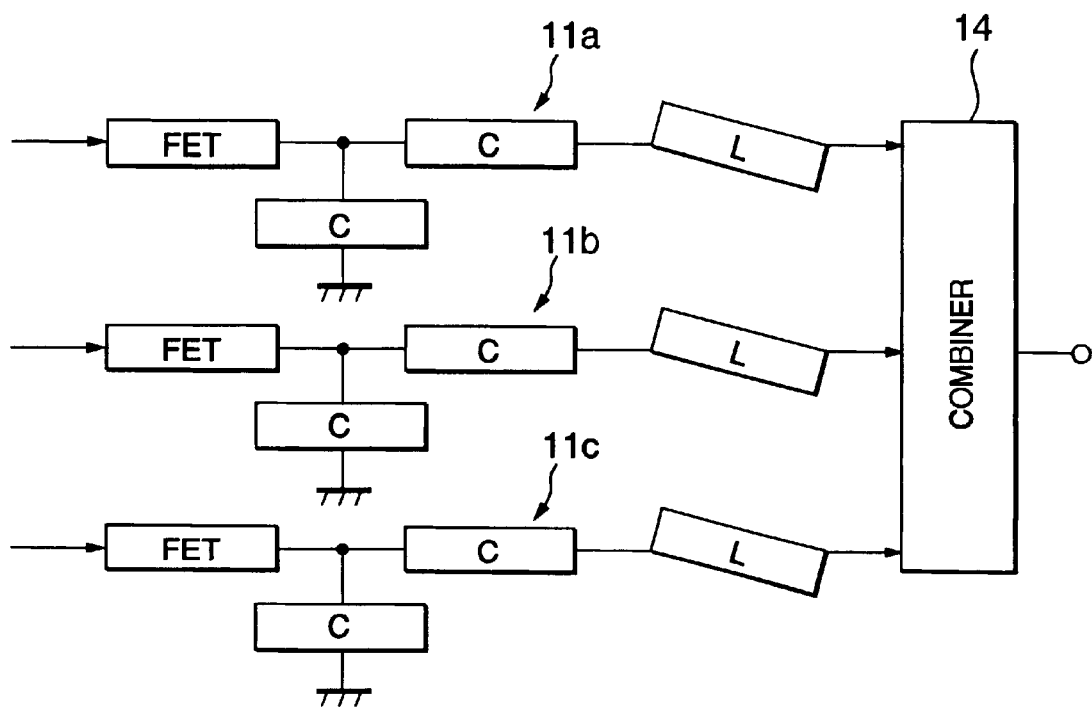
FIG. 13 is a block diagram showing the eighth embodiment of the electrodeless discharge lamp system according to the present invention.

FIG. 13 a brief circuit configuration diagram showing the eighth embodiment of the electrodeless discharge lamp system according to the present invention. In FIG. 13, the principal configuration of the electrodeless discharge lamp system of the present embodiment is common to that of the first embodiment, as shown in FIG. 1. Thus, the same elements as those, as shown in FIG. 1, are assigned with same marks and omitted the explanation.

In the present embodiment, each of three parallel-connected converters 11a, 11b and 11c constructing the high frequency power source is comprised of an FET and a series LC resonance filter for a class-E operation. The FETs are arranged in parallel with each other, and the coils L which constitute the inductor of the series LC resonance filter are arranged in parallel with each other and in a slanting position against the corresponding FETs.

That is, when the power of multiple power converters coupled in parallel which are used as a high frequency power source are combined in the combiner, the phase change in each power converter output increases the combiner loss. In order to prevent this combiner loss, the parts of each power converter are aligned roughly in a row, and these power converters are coupled in parallel with each other for achieving a high-density arrangement of components. However, in such an arrangement, since coils, which constitute an inductor of each series LC resonance filter, are align horizontally, the gaps between these coils are lessen in case of reducing the mounting area ever further for the high-density arrangement. Thus, these coils interfere with each other so as to change the filter constant. As shown in FIG. 13, in the present embodiment, by constituting each power converter with an FET and a series LC resonance filter for a class-E operation, and arranging the FETs in parallel with each other and the coils which constitute the inductor of the series LC resonance filter in parallel with each other and in a slanting position against the corresponding FETs, it is able to reduce the mutual interference and achieve a high-density parts arrangement.

Ninth Embodiment

Figure 14:
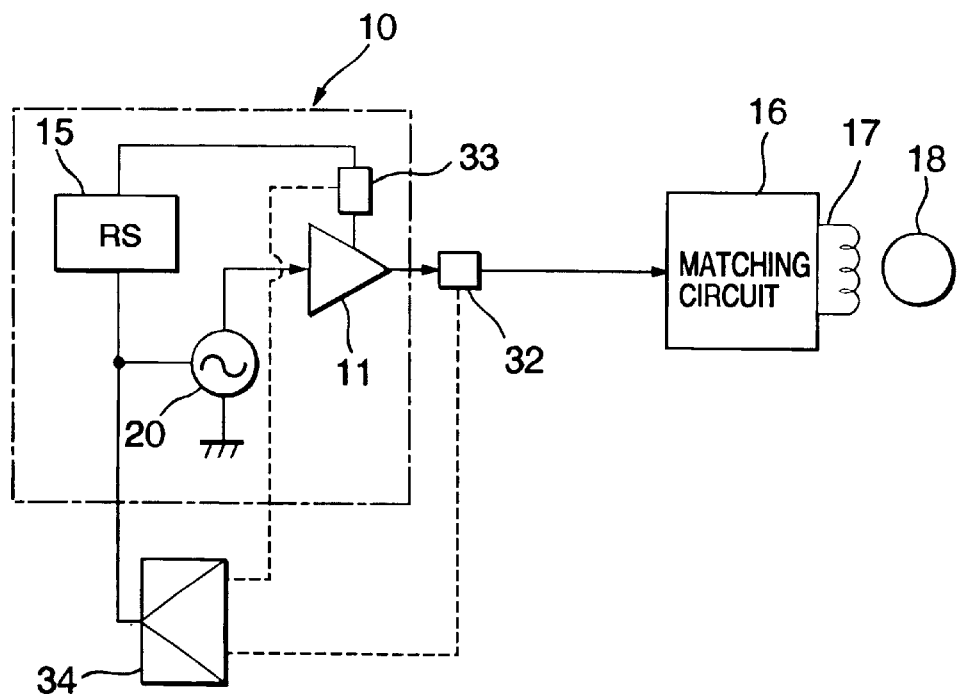
FIG. 14 is a block diagram showing ninth embodiment of the electrodeless discharge lamp system according to the present invention.

FIG. 14 is a is a brief circuit configuration diagram showing the ninth embodiment of the electrodeless discharge lamp system according to the present invention. In FIG. 14, the principal configuration of the electrodeless discharge lamp system of the present embodiment is common to that of the first embodiment, as shown in FIG. 1. Thus, the same elements as those, as shown in FIG. 1, are assigned with same marks and omitted the explanation.

In the present invention, the mismatch between the changed impedance of the electrodeless discharge lamp 18 which is the load and the output impedance of the high frequency power source 10 will be detected based on the phase angle of the output of the high frequency power source 10. That is, the phase angle is detected in a phase detector 32 and fed back to the high frequency power source 10 via a controller 34, thus the output frequency of the high frequency power source 10 is changed to match its impedance to the load. However, the adjustment of the impedance by only changing the frequency might cause a harmful influence of changing the output power. Thus, in the present embodiment, the output power of the high frequency power source 10 is controlled by detected in a power detector 33 and fed back to the high frequency power source 10 via the controller 34, so as to solve the harmful influence as described above. As a result, the output impedance of the high frequency power source 10 is matched to the impedance which is the load of the electrodeless discharge lamp, thus, the output power may be regulated. Here, in FIG. 14, the reference numeral 11 denotes a power converter, while the reference numeral 15 denotes a DC power source.

The preferred embodiments of the present invention are explained above. However, various modifications and applications of this invention are contemplated which may be realized without departing from the spirit and scope of the present invention.

As described above, the present invention is able to provide an electrodeless discharge lamp system which is able to simplify the configuration of the high frequency power source for the electrodeless discharge lamp, and which can reduce the cost of manufacturing, and enhance the efficiency of power.

While there have been illustrated and described what are at present considered to be preferred embodiments of the present invention, it will be understood by those skilled in the art that various changes and modifications may be made, and equivalent may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawing are regarded by the applicant as including a variety of individually inventive concepts, some of which may he partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and may be defined by claims differing in scope from the following claims, which different claims may be adopted subsequently during prosecution, for example, for the purposes of a divisional application.

What is claimed is:

1. An electrodeless discharge lamp system comprising:
   an electrodeless discharge lamp;
   an excitation coil placed in proximity of the electrodeless discharge lamp;
   a resonance circuit for supplying appropriate power to the excitation coil;
   a high frequency power source driver for supplying a high frequency output to the resonance circuit, wherein the high frequency power source driver comprises parallel-connected power sources and the high frequency output is achieved by operating the parallel-connected power sources in substantial synchronization with each other; and
   a DC voltage superposing circuit for superposing a DC voltage on the output of the driver.

2. An electrodeless discharge lamp system comprising:
   an electrodeless discharge lamp;
   an excitation coil placed in proximity of the electrodeless discharge lamp;
   a resonance circuit for supplying appropriate power to the excitation coil;
   a high frequency power source driver for supplying a high frequency output to the resonance circuit, wherein the high frequency power source driver comprises parallel-connected power sources and the high frequency output is achieved by operating the parallel-connected power sources in substantial synchronization with each other; and
   a DC voltage superposing circuit for superposing a DC voltage on the output of the driver, wherein the DC voltage is adjustable in the DC voltage superposing circuit.

3. An electrodeless discharge lamp system claimed in any one of claims 1 and 2, wherein the DC voltage superposing circuit generates a mean voltage by half-wave rectifying the output of the high frequency power source.

4. An electrodeless discharge lamp system, comprising:
   multiple electrodeless discharge lamp units having multiple electrodeless discharge lamps, excitation coils placed in proximity of these electrodeless discharge lamp, and a matching circuit for supplying an appropriate power to each excitation coil;

high frequency power sources, which are supplied with an external reference clock signal and which amplify the reference clock signal for supplying high frequency power to the electrodeless discharge lamp units via coaxial cables; and a reference clock generator connected to each of the high frequency power sources for supplying in parallel only one reference clock signal to the high frequency power sources via coaxial cables, wherein the lengths of respective coaxial cables connecting the reference clock generator and the high frequency power sources are substantially the same.

5. An electrodeless discharge lamp system, comprising:

multiple electrodeless discharge lamp units having multiple electrodeless discharge lamps, excitation coils placed in proximity of these electrodeless discharge lamps, and a matching circuit for supplying an appropriate power to each excitation coil;

high frequency power sources, which are supplied with an external reference clock signal and which amplify the reference clock signal for supplying high frequency power to the electrodeless discharge lamp units via coaxial cables; and a reference clock generator connected in a cascaded manner to each of the high frequency power sources for supplying only one reference clock signal to the high frequency power sources via coaxial cables, wherein the length of the coaxial cables connected to respective high frequency power sources are substantially the same so as to make substantially equal a phase of the reference clock and phases of outputs of the high frequency power sources.

6. An electrodeless discharge lamp system, comprising:

a bactericidal device provided with multiple electrodeless discharge lamps, excitation coils placed in proximity of these electrodeless discharge lamps, matching circuits for supplying appropriate powers to the excitation coils, and a bactericidal tank accommodating therein multiple electrodeless discharge lamp units; high frequency power sources for supplying high frequency powers to the electrodeless discharge lamp units; and DC power sources for supplying DC voltages to the high frequency power sources, wherein the DC voltages are determined as a single unit by applying only one external dimming signal to each DC power sources.

7. An electrodeless discharge lamp system as claimed in claim 6, wherein feedback signals for determining the DC voltages based on the amount the power detectable in the electrodeless discharge lamp system itself, and then the DC voltages are determined as a single unit.

8. An electrodeless discharge lamp system, comprising:

an electrodeless discharge lamp;

an excitation coil for supplying a high frequency power to the electrodeless discharge lamp;

a high frequency power source for generating the high frequency power;

a high frequency power source driver; and an output circuit for outputting the high frequency power of the high frequency power source to the excitation coil, wherein the high frequency power source is provided with a main amplifier, a preamplifier for driving the main amplifier and a coaxial cable for coupling the main amplifier and the preamplifier, wherein the high frequency power source is provided with a distributor for a block of multiple main amplifiers, and the preamplifier is connected to the distributor via a coaxial. cable.

9. An electrodeless discharge lamp system as claimed in claim 8, wherein the high frequency power source is provided with a distributor for a block of multiple preamplifiers, and the distributor is connected to multiple main amplifiers via coaxial cables.

10. An electrodeless discharge lamp system, comprising:

an electrodeless discharge lamp;

an excitation coil for supplying a high frequency power to the electrodeless discharge lamp;

a high frequency power source provided with multiple parallel-connected power converters for generating the high frequency power;

a high frequency power source driver; an output circuit for outputting the high frequency power of the high frequency power source to the excitation coil; and a combiner provided with a balance resistor for combining parallel outputs from the power converters, wherein when an output terminal of either one of the power conversion circuits is opened, short-circuited or no signal input, a rated power of the balance resistor in the combiner is set to a value that the output terminal of other power converters can not stand.

11. An electrodeless discharge lamp system as claimed in claim 10, further comprising:

a distributor provided with a balance resistor for distributing the parallel inputs to the power converters, wherein when the output terminal of either one of the power conversion circuits is opened, short-circuited or no signal input, the rated power of the balance resistor in the distributor is set to a value that the output terminal of other power converters can not stand.

12. An electrodeless discharge lamp system as claimed in claim 11, wherein the distributor and the combiner are arranged on the extension of or equidistantly from the parallel-connected power converters.

13. An electrodeless discharge lamp system, comprising:

an electrodeless discharge lamp;

an excitation coil for supplying a high frequency power to the electrodeless discharge lamp;

a high frequency power source provided with multiple parallel-connected power converters for generating the high frequency power;

a high frequency power source driver;

an output circuit for outputting the high frequency power of the high frequency power source to the excitation coil;

multiple stages of combiners for combining the parallel outputs from the power converters; and an impedance converter provided with a $\lambda/4$ transmission line for converting the impedance of the combined power into a characteristic impedance of a transmission cable to the electrodeless discharge lamp.

14. An electrodeless discharge lamp system, comprising;

an electrodeless discharge lamp;

an excitation coil for supplying a high frequency power to the electrodeless discharge lamp;

a high frequency power source provided with multiple parallel-connected power converters for generating the high frequency power;

a high frequency power source driver; and an output circuit for outputting the high frequency power of the high frequency power source to the excitation coil, wherein each of the power converters is provided with an FET and a series LC resonance filter for a class-E operation, and wherein respective FETs are arranged in parallel with each other, and coils constituting an inductor of the series LC resonance filter are arranged in parallel with each other, and in a slanting position against the corresponding FETS.

15. An electrodeless discharge lamp system comprising:

an electrodeless discharge lamp;

an excitation coil for supplying a high frequency power to the electrodeless discharge lamp;

a high frequency power source for generating the high frequency power;

a high frequency power source driver; and an output circuit for outputting the high frequency power of the high frequency power source to the excitation coil, wherein the electrodeless discharge lamp system is constructed and arranged such that a phase angle of an output of the high frequency power source is detected, and a frequency of the high frequency power source is varied in response to the detected phase angle of the output of the high frequency power source, and wherein the system is configured that a power source voltage of the high frequency power source is detected, and the power source voltage is varied in response to the detected power of the high frequency power source.

* * * * *

UNITED STATES PATENT AND TRADEMARK OFFICE
CERTIFICATE OF CORRECTION

PATENT NO. : 6,700,332 B2
DATED : March 2, 2004
INVENTOR(S) : Ichiro Yokozeki et al.

It is certified that error appears in the above-identified patent and that said Letters Patent is hereby corrected as shown below:

Title page,
Item [75], Inventors, please replace 4th inventor's first name with -- Toshiya --.
Item [30], Foreign Application Priority Data, please insert -- Sept. 26, 2000 (JP) 2000-291495 --.
Item [57], ABSTRACT, please replace as follows:
-- An electrodeless discharge lamp system includes an excitation coil placed in proximity of the electrodeless discharge lamp, a resonance circuit for supplying appropriate power to the excitation coil, and a high frequency power source driver and wherein, the combined output is achieved by operating the parallel-connected power sources in sychronization or approximately in sychronization with each. --

Signed and Sealed this

Twenty-fourth Day of August, 2004

JON W. DUDAS
*Director of the United States Patent and Trademark Office*